Dec. 12, 1933.   M. ROMAINE   1,938,784
MACHINE TOOL
Filed Feb. 27, 1930   2 Sheets-Sheet 1

Inventor
MILLARD ROMAINE
By HK Parsons
Attorney

Dec. 12, 1933.         M. ROMAINE         1,938,784
MACHINE TOOL
Filed Feb. 27, 1930         2 Sheets-Sheet 2

Inventor
MILLARD ROMAINE
By AHK Parsons
Attorney

Patented Dec. 12, 1933

1,938,784

UNITED STATES PATENT OFFICE 1,938,784

MACHINE TOOL

Millard Romaine, Cincinnati, Ohio, assignor to The Cincinnati Milling Machine Company, Cincinnati, Ohio, a corporation of Ohio Application February 27, 1930. Serial No. 431,909

2 Claims. (Cl. 90—11)

This invention relates to machine tools and more particularly to an improved machine tool trip for automatically controlling the movements of a translatable part thereof.

One of the principal objects of the present invention is the provision of an improved control mechanism, for that class of machine tools such as milling machines having an organized mechanism for executing a plurality of different cyclic movements in a work holder with respect to a cutter, which is more efficient and smoother in operation and less liable to cause damage or breakage of parts.

Another object of this invention is the provision of an improved dog actuated machine tool trip, for controlling the rate and direction of a moving part, which is faster in operation, thereby requiring less movement of the part to effect a tripping thereof.

Other objects and advantages of the present invention should be readily apparent by reference to the following specification, considered in conjunction with the accompanying drawings illustrative of one embodiment thereof, but it will be understood that any modifications may be made in the specific structural details hereinafter disclosed, within the scope of the appended claims, without departing from or exceeding the spirit of the invention.

Referring to the drawings, in which like reference numerals indicate like parts:

Figure 1:
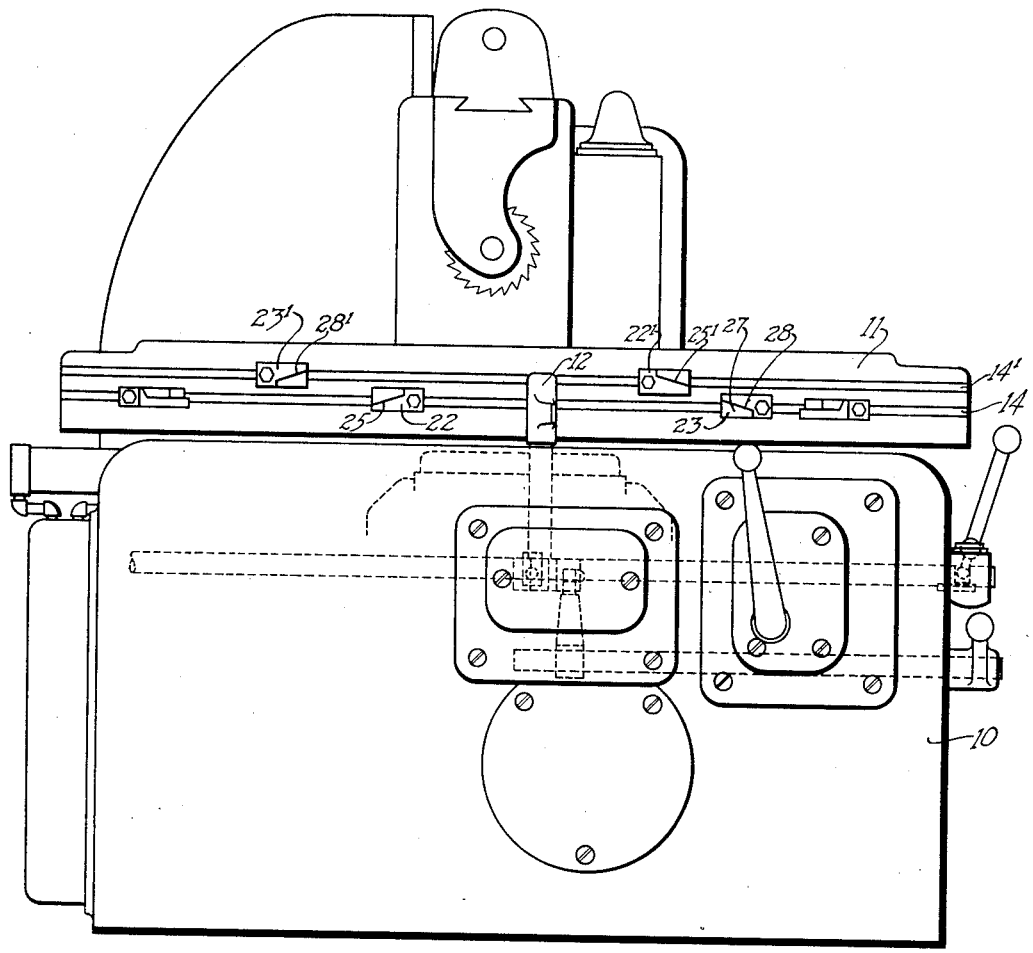
Figure 1 is a front elevation of a machine showing one embodiment of the invention.

Referring to the drawings, the reference numeral 10 indicates a supporting portion of a machine tool upon which may be slidably mounted a slide or table indicated by the reference numeral 11. The table 11 is adapted to be reciprocated by any known means. The invention is shown herein as embodied in a bed type machine for illustrative purposes only and is not to be so limited, as it may be embodied in such other types as a knee and column type of machine as well.

The trip member 12 is rotatably and slidably mounted in the supporting portion 10 of the machine and is adapted to be connected with known types of change speed and control mechanism, for controlling the rate and direction of movement of the table 11. For instance, the lower end thereof may be connected by ball and socket means to a rate change and control lever such as shown in copending aplication #220,721, filed September 15, 1927, or it may be connected to the rate change and control mechanism shown in the patent to Hazelton #1,390,706. In both instances the plunger is movable up and down and to the right or left, giving it four positions. In order to effect these movements, an upper and lower T-slot are formed in the table for the reception of dogs. The dogs in the upper T-slot are provided for controlling the vertical movements of the plunger while the table is traveling in one direction and the dogs in the lower T-slot for controlling the vertical movements while traveling in the other direction. The dogs for rotating the plunger and thus controlling the direction of movement are mounted in the lower T-slot.

Figure 2:
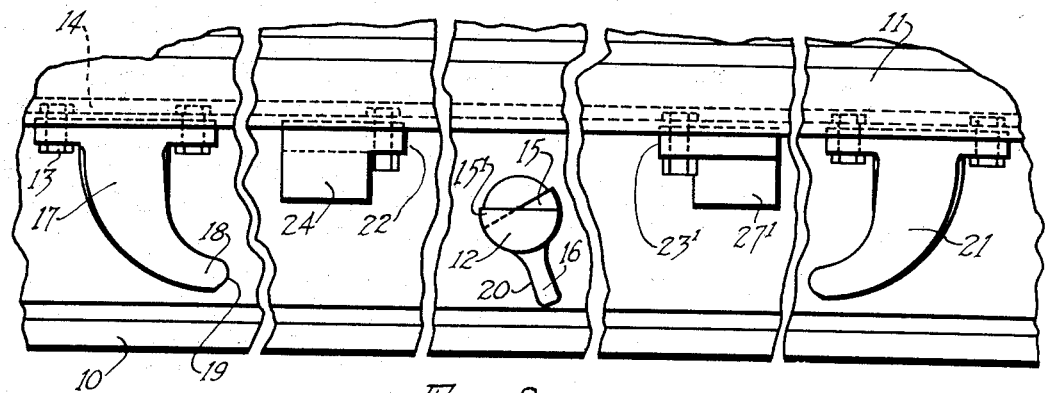
Figure 2 is a plan view showing the relative location of the dogs and trip member.
Figure 3:
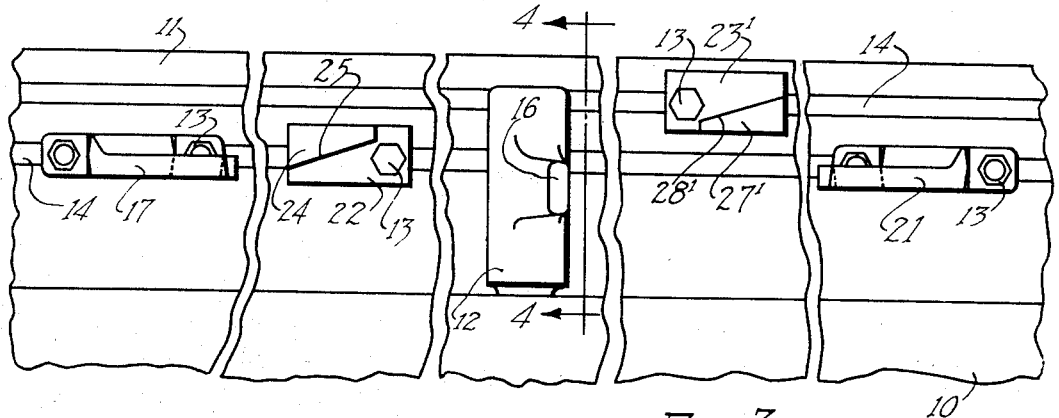
Figure 3 is an elevation of that shown in Figure 2.
Figure 4:
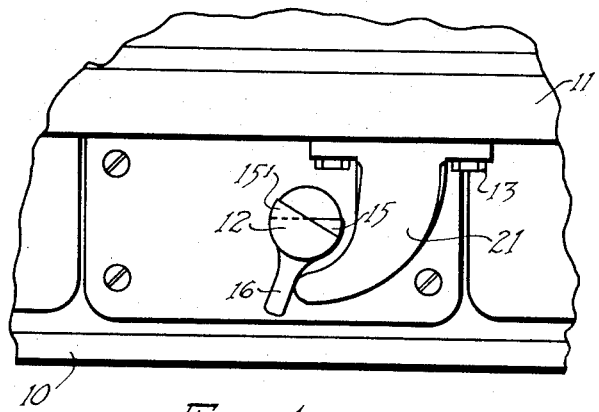
Figure 4 is a detail showing the parts in trip position.
Figure 5:
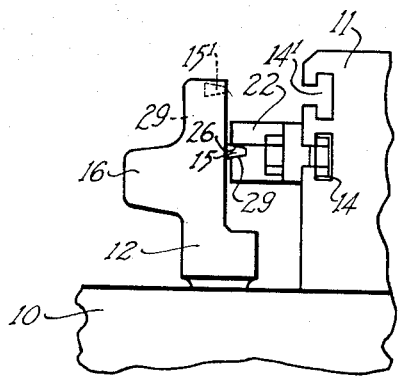
Figure 5 is a detail on the line 4—4 of Figure 3.

In order to effect the various movements of the member 12, dogs have been provided which are adapted to be attached to the longitudinal edge of the table 11 by means of bolts 13 mounted in T-slots 14 and 14' formed in the table. For cooperation with these dogs, control member 12 is provided with lugs or extensions 15 and 15' on one side and a laterally projecting wing 16 on the opposite side. The projections 15 and 15' are adapted, upon cooperation with proper dogs, to move the trip plunger 12 axially and the wing 16 adapted, upon cooperation with properly formed dogs, to rotate trip plunger 12. The dog 17 shown in Figure 2 is adapted to cooperate with the wing 16 of trip member 12 and has a portion 18 which projects substantially parallel with the table 11 and has a surface 19 for engagement with the surface 20 of the trip member, so that upon reciprocation of the table in one direction, the trip member being in the position shown in Figure 4 will be moved to the position shown in Figure 2. Another dog 21 is also provided which is similar to the dog 17 but opposite in hand and effects a reverse rotation of the trip member 12.

The table has mounted thereon, in the T-slot 14, other dogs 22 and 23 for cooperation with the projection 15 of the trip member 12 to effect an axial movement thereof. The trip dog 22 has a projection 24 which has a beveled surface 25 on its under side for engagement with the upper face 26 of the projection 15 for moving the trip member 12 downward. The dog 23 has a projection 27 which has an upper beveled surface 28 for cooperation with the surface 29 of the projection 15 for causing movement of the trip member 12 axially upward.

It will be noted that the wing portion 16 is sufficient in axial length to permit engagement with either of the dogs 17 or 21 when it is in either its upward or downward position. The provision of the wing on the side opposite to the projections 15 and 15' allows the wing to be engaged at substantially a right angle by the dogs, which is the most efficient angle and also permits engagement at a short leverage from the axis of the member whereby a smaller movement of the table is required to trip the member.

Similar dogs 22' and 23' are provided in the upper T-slot 14' which have similar surfaces 25' and 28' for respectively cooperating with the projection 15' to move the plunger down or up. It is apparent from Figure 1 that these dogs 22' and 23' are adapted to actuate the plunger while the table is travelling toward the left and the dogs in the T-slot 14 are adapted to actuate the plunger while the table is travelling toward the right. Any number of dogs may of course be used in each slot depending upon the requirements of the particular set-up of the machine.

What is claimed is:

1. A milling machine having in combination with a support and a work table reciprocably mounted on the support, means to automatically control the rate and direction of movement of the table including a trip plunger journaled in the support adjacent a side of the table and adapted to be connected to rate control mechanism for actuation thereof upon axial movement of the plunger and adapted to be connected to direction determining mechanism for actuation thereof upon rotation of the plunger, a radial wing projecting from the side of the plunger opposite to the table, bevel surface projections extending from the side of the plunger adjacent the table, a first trip dog carried by the table and extending therefrom to engage a proximate beveled projection of the plunger to effect axial movement thereof, and an additional trip dog projecting from the table and extending through the axial plane of the plunger, said latter dog having a laterally deflected terminal portion for engagement with the radial wing at the side of the plunger remote from the table whereby a direct positive rotating pressure without wedging is exerted against said wing.

2. The combination with a machine tool including a support and a slide mounted for movement thereover, and means for controlling movement of the slide, of automatic mechanism for actuating said control means, including a trip plunger mounted on the support adjacent the slide, an actuable wing projecting from the side of the plunger remote from the slide in a direction away from the slide, and a plunger actuating dog carried by the slide and movable therewith, said dog having a portion extending through the plane of the plunger for operative reaction against the wing in a direction substantially parallel with the direction of movement of the slide, whereby wedging and cramping of the plunger by action of interengagement of the dog and wing are prevented.

MILLARD ROMAINE.